United States Patent
Reed et al.

(10) Patent No.: US 8,705,545 B2
(45) Date of Patent: Apr. 22, 2014

(54) N-WAY ROUTING PACKETS ACROSS AN INTERMEDIATE NETWORK

(75) Inventors: Darren J. Reed, Prague (CZ); Darrin P. Johnson, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 239 days.

(21) Appl. No.: 13/212,765

(22) Filed: Aug. 18, 2011

(65) Prior Publication Data

US 2013/0044759 A1 Feb. 21, 2013

(51) Int. Cl.
*H04L 29/06* (2006.01)

(52) U.S. Cl.
USPC ........... 370/401; 370/466; 370/392; 370/465; 370/475

(58) Field of Classification Search
USPC ......................................................... 370/401
See application file for complete search history.

(56) References Cited

U.S. PATENT DOCUMENTS

| | | | |
|---|---|---|---|
| 6,118,784 A * | 9/2000 | Tsuchiya et al. | 370/401 |
| 6,650,640 B1 * | 11/2003 | Muller et al. | 370/392 |
| 6,690,669 B1 * | 2/2004 | Tsuchiya et al. | 370/392 |
| 6,912,219 B2 * | 6/2005 | Tsuchiya et al. | 370/392 |
| 7,321,598 B2 * | 1/2008 | Blanchet et al. | 370/466 |
| 7,415,536 B2 * | 8/2008 | Nakazawa | 709/245 |
| 7,437,470 B2 * | 10/2008 | Fernandes et al. | 709/230 |
| 7,746,891 B2 | 6/2010 | Yamamoto et al. | |
| 7,788,408 B2 * | 8/2010 | Takeda et al. | 709/245 |
| 7,792,058 B1 * | 9/2010 | Yip et al. | 370/255 |
| 7,885,257 B2 * | 2/2011 | Droux et al. | 370/389 |
| 7,895,348 B2 * | 2/2011 | Twitchell, Jr. | 709/230 |
| 7,912,926 B2 * | 3/2011 | Belgaied et al. | 709/220 |
| 7,936,766 B2 * | 5/2011 | Li et al. | 370/395.5 |
| 7,957,405 B2 * | 6/2011 | Higuchi et al. | 370/401 |
| 7,995,571 B2 * | 8/2011 | Park | 370/389 |
| 8,031,716 B2 * | 10/2011 | Tsuchiya et al. | 370/392 |
| 8,131,863 B2 * | 3/2012 | Takeda et al. | 709/228 |
| 8,214,522 B2 * | 7/2012 | Chanda | 709/236 |

(Continued)

OTHER PUBLICATIONS

Tunneling IPv6 Traffic over MPLS IPv4 Networks, Retrieved from the Internet <http://www.juniper.net/techpubs/en_US/junos9.6/information-products/topic-collections/config-guide-mpls-applications/mpls-tunneling-ipv6-traffic-over-mpls-ipv4-networks.html>, 1999-2000, (4 pages).

(Continued)

*Primary Examiner* — Ian N Moore
*Assistant Examiner* — Lakeram Jangbahadur
(74) *Attorney, Agent, or Firm* — Osha Liang LLP

(57) ABSTRACT

A system and method for routing packets. The method includes receiving a first packet from an intermediate network by a first network interface card (NIC) operatively connected to a host, where the first packet originates from a first remote network, where the first NIC is operatively connected to the intermediate network, and where the first packet, the intermediate network, and the first NIC use a first network protocol. The method further includes classifying, by the first NIC, the first packet based on the first remote network, sending the first packet to a first receive ring in the first NIC, sending the first packet from the first receive ring to a first non-global container, and converting the first packet, using a first converter located in the first non-global container, to obtain a first converted packet, where the first converted packet and the first remote network use a second network protocol.

16 Claims, 9 Drawing Sheets

(56) References Cited

U.S. PATENT DOCUMENTS

| | | | | |
|---|---|---|---|---|
| 8,406,232 | B2* | 3/2013 | Alkhatib | 370/392 |
| 2006/0256814 | A1* | 11/2006 | Caci | 370/466 |
| 2007/0101023 | A1* | 5/2007 | Chhabra et al. | 709/246 |
| 2008/0183853 | A1* | 7/2008 | Manion et al. | 709/223 |
| 2009/0254984 | A1* | 10/2009 | Nice et al. | 726/11 |
| 2009/0290564 | A1* | 11/2009 | Shin et al. | 370/338 |
| 2009/0323690 | A1* | 12/2009 | Lu et al. | 370/392 |
| 2010/0158012 | A1* | 6/2010 | Higuchi et al. | 370/392 |
| 2010/0260203 | A1* | 10/2010 | Moon et al. | 370/467 |

OTHER PUBLICATIONS

RFC 4798—Connecting IPv6 Islands over IPv4 MPLS Using IPv6 Pro. Retrieved from the Internet <http://www.faqs.org/rfcs/rfc4798.html>, 2011, (12 pages).

ZebOS® Virtual Routing and Switching, Retrieved from the Internet <http://www.ipinfusion.com/products/advanced/ars_vrs.html>, 2011, (2 pages).

6bone Connection Using 6to4 Tunnels for IPv6—Cisco Systems, Retrieved from the Internet <http://www.cisco.com/en/US/tech/tk872/technologies_configuration_example09186a00801f3b4f.shtml>, 2011 (7 pages).

Vyatta Network Virtualization Software. Retrieved from the Internet <http://www.vyatta.com/products/virtualized.php>, 2011 (3 pages).

* cited by examiner

N-WAY ROUTING PACKETS ACROSS AN INTERMEDIATE NETWORK

BACKGROUND

Conventionally, in the computer-related arts, a network is an arrangement of physical computer systems configured to communicate with each other. Network traffic is transmitted over the network from a sending computer system, via a network interface, to a receiving computer system via a second network interface.

Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

SUMMARY

In general, in one aspect, the invention relates to a non-transitory computer readable medium having computer readable program code embodied therein, the computer readable program code adapted to, when executed by a processor, implement a method. The method includes receiving a first packet from an intermediate network by a first network interface card (NIC) operatively connected to a host, where the first packet originates from a first remote network, where the first NIC is operatively connected to the intermediate network, and where the first packet, the intermediate network, and the first NIC use a first network protocol; classifying, by the first NIC, the first packet based on the first remote network; sending the first packet to a first receive ring in the first NIC based on the classification of the first packet; sending the first packet from the first receive ring to a first non-global container, where the first non-global container is located in a global container; and converting the first packet, using a first converter located in the first non-global container, to obtain a first converted packet, where the first converted packet and the first remote network use a second network protocol.

In general, in one aspect, the invention relates to a system. The system includes a first physical network interface card (NIC) operatively connected to a local network and comprising: a classifier; a first receive ring; and a second receive ring. The classifier is configured to: classify a first packet received from the local network according to a first destination network of the first packet, and send the first packet to the first receive ring based on the classification of the first packet, where the local network, the first destination network, and the first packet use a first network protocol. The system also includes a router host, operatively connected to the first NIC, and including a global container. The global container includes: a first non-global container associated with the first destination network and comprising a first converter; and a first virtual network interface card (VNIC) configured to receive the first packet from the first receive ring, where the first non-global container is configured to receive the first packet from the first VNIC, where the first converter is configured to convert the first packet into a first converted packet using a second network protocol, and where the first converted packet is addressed to a second router host located in the first destination network.

In general, in one aspect, the invention relates to a non-transitory computer readable medium having computer readable program code embodied therein, the computer readable program code adapted to, when executed by a processor, implement a method. The method includes receiving a first packet from a local network by a first network interface card (NIC) operatively connected to a router host, where the first packet originates from the local network and is sent to a first destination located in a first remote network, and where the first NIC is operatively connected to the local network; classifying, by the first NIC, the first packet based on the first remote network; sending the first packet to a first receive ring in the first NIC based on the classification of the first packet; sending the first packet from the first receive ring to a first virtual network interface card (VNIC) associated with the first receive ring; sending the first packet from the first VNIC to a first non-global container associated with the first VNIC; converting the first packet, using a first converter located in the first non-global container, to obtain a first converted packet; sending the first converted packet from the first non-global container to a second VNIC associated with the first non-global container, sending the first converted packet from the second VNIC to a second NIC; and sending the first converted packet from the second NIC to the first destination using an intermediate network, where the second NIC is operatively connected to the intermediate network, where the first packet, the local network, the first remote network, the first NIC, and the first VNIC use a first network protocol, and where the first converted packet, the second VNIC, the second NIC, and the intermediate network use a second network protocol.

Other aspects of the invention will be apparent from the following description and the appended claims.

DETAILED DESCRIPTION

Figure 1A:
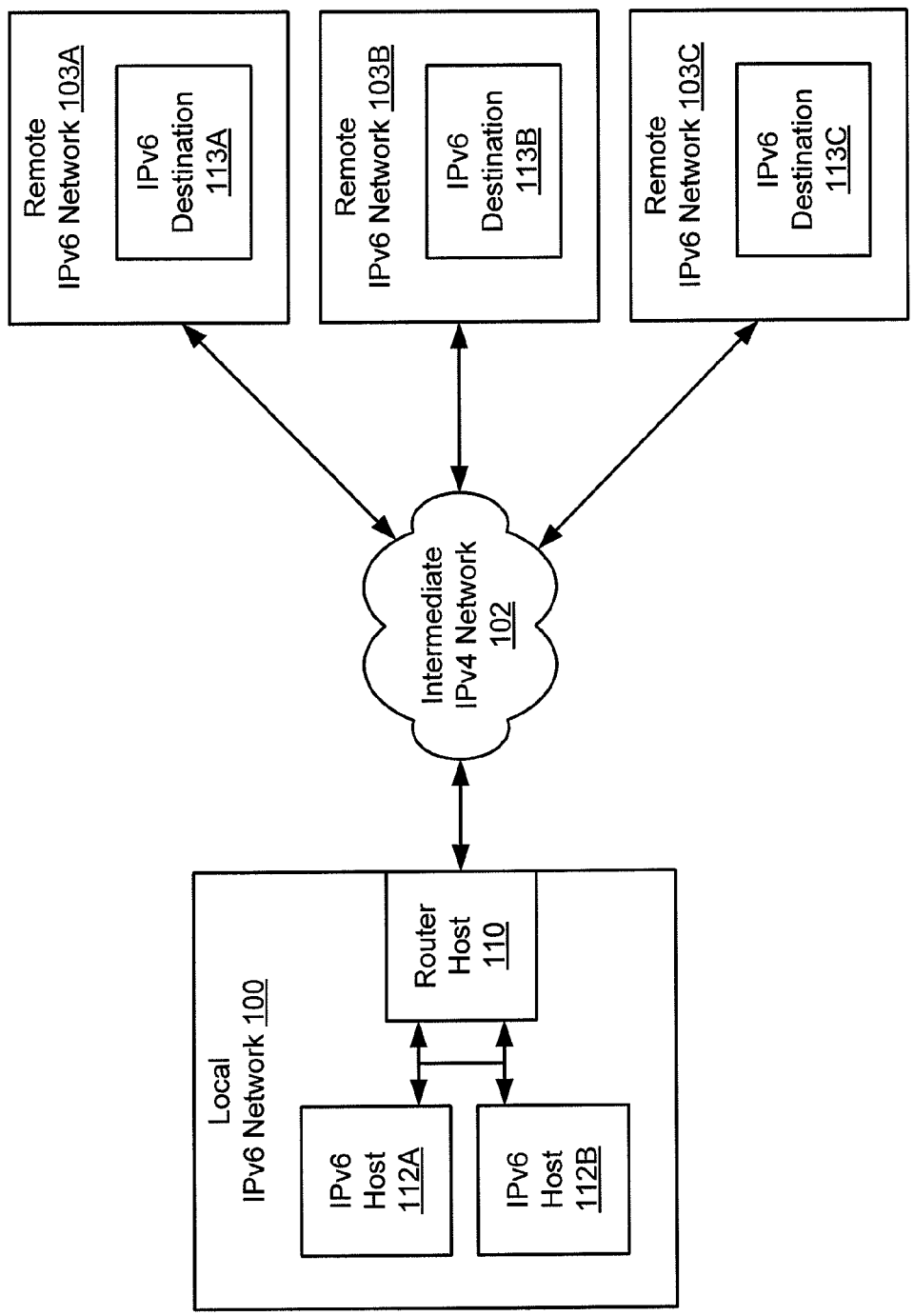
FIGS. 1A-1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to route packets using a first protocol (e.g., Internet Protocol version 6 (IPv6)) across an intermediate network configured using a second protocol (e.g., Internet Protocol version 4 (IPv4)). In one or more embodiments of the invention, a router host is located in a local network using the first protocol. The router host may be configured to embed a first packet using the first protocol in the payload of a second packet (or packets) using a second protocol, and to send the second packet(s) across the intermediate network. The second packet(s) may be received by a second router host at a remote network using the second protocol. The second router host may extract the first packet from the second packet(s), and may route the first packet to a destination located in the remote network. In one or more embodiments, the router host may include multiple containers, each uniquely associated with a given remote network. Further, in one or more embodiments, each container may include a converter for converting packets of the first protocol to packets of the second protocol. Embodiments of the invention may allow a local network of the first protocol to communicate with multiple remote networks of the first protocol by using an intermediate network of the second protocol.

In the following description, embodiments of the invention are described in terms of the IPv6 and IPv4 protocols for the sake of illustration. However, a person of skill in the art will appreciate that these are exemplary embodiments, and are not intended to limit the invention. Specifically, embodiments of the invention may be implemented using any other network protocols. Accordingly, a person of skill in the art will appreciate that any reference herein to IPv6 and IPv4 may represent any combination of network protocols.

FIG. 1A shows a schematic diagram of a system environment in accordance with one or more embodiments of the invention. As shown in FIG. 1A, the system environment may include an intermediate IPv4 network (102) providing network connectivity between a local IPv6 network (100) and multiple remote IPv6 networks (103A-103C). In one or more embodiments, the local IPv6 network (100) may include multiple IPv6 hosts (112A-112B) and a router host (110). The router host (110) is described in greater detail below with reference to FIG. 1B. The router host (110) and the IPv6 hosts (112A-112B) may each include functionality to send and receive IPv6 packets via the local IPv6 network (100).

In one or more embodiments, each of the remote IPv6 networks (103A-103C) may include one or more IPv6 destinations (113A-113C) and a router host (not shown). In one or more embodiments, the IPv6 destinations (113A-113C) and router hosts (not shown) may each include functionality to send and receive IPv6 packets via the remote IPv6 network (103) in which they are located.

In one or more embodiments, the router host (110) may be configured to enable IPv6 packets issued by the IPv6 hosts (112A-112B) to be sent to the IPv6 destinations (113A-113C) using the intermediate IPv4 network (102). Specifically, in one or more embodiments, the router host (110) may include functionality to embed an outbound IPv6 packet (i.e., a packet sent by one of the IPv6 hosts (112A-112B)) in IPv4 packet(s) to obtain an outbound converted packet. As used herein, the term "converted packet" refers to one or more IPv4 packets generated from an IPv6 packet. The converted packet may then be routed across the intermediate IPv4 network (102) to the one of the router hosts (not shown) included in the remote IPv6 networks (103A-103C). Further, in one or more embodiments, each router host in a remote IPv6 network (103A-103C) may include functionality to extract an IPv6 packet embedded in a received converted packet (e.g., one or more IPv4 packets received from another router host via the intermediate IPv4 network (102)).

In one or more embodiments, the router host (110) may be further configured to enable IPv6 packets issued by the IPv6 destinations (113A-113C) to be sent to the IPv6 hosts (112A-112B) using the intermediate IPv4 network (102). Specifically, in one or more embodiments, the router host (110) may include functionality to extract an IPv6 packet embedded in a received converted packet (e.g., one or more IPv4 packets received via the intermediate IPv4 network (102) from a router host in one of the remote IPv6 networks (103A-103C)).

In one or more embodiments, the IPv4 and IPv6 networks shown in FIG. 1A may include any combination of wired segments (i.e., using a tangible connection medium such as Ethernet cables) and/or wireless segments (i.e., using an intangible connection medium such as radio waves), as well as any required networking devices (e.g., routers, switches, hubs, etc.). Further, the IPv4 and IPv6 networks shown in FIG. 1A may be implemented across one or more of a local area network (LAN), a wide area network (WAN), an enterprise intranet, the Internet, a mobile telephone service provider network, the public switched telephone network (PSTN), etc.

Figure 1B:
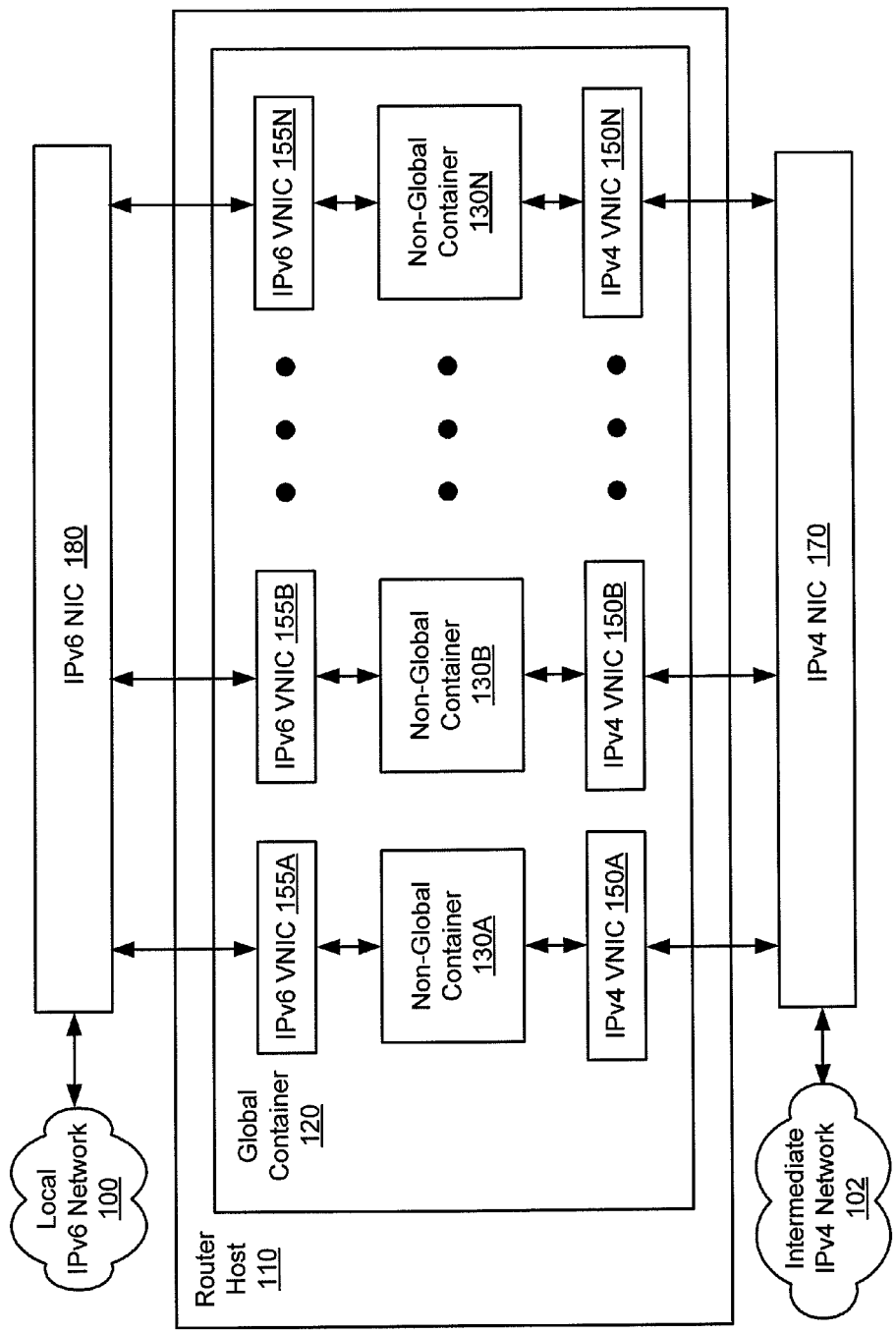

FIG. 1B shows a schematic diagram of the router host (110) in accordance with one or more embodiments of the invention. As shown in FIG. 1B, the router host (110) may be operatively connected to an IPv6 network interface card (NIC) (180) and to an IPv4 NIC (170). In one or more embodiments, the IPv6 NIC (180) may provide a physical network interface between the router host (110) and the local IPv6 network (100). Further, the IPv4 NIC (170) may provide a physical network interface between the router host (110) and the intermediate IPv4 network (102).

In one or more embodiments, each NIC (i.e., IPv6 NIC (180) and/or IPv4 NIC (170)) may each include one or more receive rings (not shown). In one or more embodiments, such receive rings may correspond to portions of memory within the NIC used to temporarily store packets received from a network (i.e., local IPv6 network (100) or intermediate IPv4 network (102)). Further, in one embodiment of the invention, a ring element of the receive rings may point to host memory (i.e., memory within the router host (110)). In one or more embodiments, each NIC may include functionality to analyze each packet received from the network, and to determine to which receive ring the packet should be forwarded.

In one or more embodiments, each NIC may include a classifier (not shown) configured to analyze each packet received from the network, and to determine to which of the receive rings of the NIC the packet is forwarded. Optionally, in one or more embodiments, the classifier may use the contents of one or more fields in each packet as an index into a data structure that includes information necessary to determine to which receive ring that packet is forwarded. In one or more embodiments, the classifier may be implemented entirely in hardware (i.e., a classifier may be a separate microprocessor embedded in the NIC). Optionally, the classifier may be implemented in software stored in memory (e.g., firmware, etc.) on the NIC and executed by a microprocessor on the NIC.

As shown in FIG. 1B, the router host (110) may include a global container (120). In one or more embodiments, the global container (120) may include one or more non-global containers (130A-130N). Each of the global container (120) and/or the non-global containers (130A-130N) may be an isolated execution environment. In one or more embodiments, the global container (120) and/or the non-global containers (130A-130N) may share a common kernel, and as a result, execute the same operating system. Further, the non-global containers (130A-130N) may be configured such that any processes executing in a given non-global container are restricted to execute in the non-global container and have no access to resources not assigned to the non-global container.

The components included in the non-global containers (130A-130N) are described below with reference to FIGS. 2A-2E. In one or more embodiments, each non-global container (130A-130N) may be uniquely associated with a remote IPv6 network (e.g., remote IPv6 networks (103A-103C) as shown in FIG. 1A).

In one or more embodiments, the global container (120) and/or the non-global containers (130A-130N) may be managed by a container management component (not shown) executing on the router host (110). The container management component may execute outside of the global container (120).

In one or more embodiments, the router host (110) may include a device driver (not shown). The device driver may provide an interface between the receive rings on the NICs (i.e., IPv6 NIC (180) and/or IPv4 NIC (170)) and the router host (110). More specifically, the device driver may expose the receive rings on the NICs to the router host (110).

In one or more embodiments, the global container (120) may include one or more IPv6 virtual network interface cards (VNICs) (155A-155N) and one or more IPv4 VNICs (150A-150N). In one or more embodiments, each VNIC (i.e., IPv6 VNICs (155A-155N) and/or IPv4 VNICs (150A-150N)) may provide an abstraction layer between the NICs and a non-global container (130) or global container (120). More specifically, each VNIC operates like a NIC. For example, in one or more embodiments, each VNIC may be associated with one or more IP addresses and/or one or more MAC addresses. Further, each VNIC may be optionally associated with one or more ports, and may be configured to handle one or more network protocol types. As a result, a non-global container (130) is unable to distinguish a VNIC from a physical NIC (e.g., IPv6 NIC (180) and/or IPv4 NIC (170)).

In one or more embodiments, each VNIC is associated with a MAC layer (not shown), which is responsible for moving data packets between the NIC and VNICs, to the NIC from other sources in the routing host (110), as well as between other NICs on other hosts, using MAC protocols. The MAC layer is also responsible for ensuring that collisions do not occur when signals are sent from multiple devices at the same time. In addition, the virtual VNICs may implement a MAC layer configuration, such as a virtual LAN, VPN tunnel, etc.

In one or more embodiments, each IPv6 VNIC (155) may be uniquely associated with a given non-global container (130), and may be configured to connect the non-global container (130) to the IPv6 NIC (180). Further, in one or more embodiments, each IPv6 VNIC (155) may be associated with one or more receive rings on the IPv6 NIC (180). Stated differently, an IPv6 VNIC (155) may receive incoming IPv6 packets from an associated receive ring on the IPv6 NIC (180), and may forward the IPv6 packets to the associated non-global container (130). Furthermore, in one or more embodiments, any outgoing IPv6 packet is forwarded from an IPv6 VNIC (155) to a corresponding transmit ring (not shown) of the IPv6 NIC (180), which temporarily stores the IPv6 packet before transmitting the packet over the local IPv6 network (100).

In one or more embodiments, each IPv4 VNIC (150) may be uniquely associated with a given non-global container (130), and may be configured to connect the non-global container (130) to the IPv4 NIC (170). Further, in one or more embodiments, each IPv4 VNIC (150) may be associated with one or more receive rings on the IPv4 NIC (170). Stated differently, an IPv4 VNIC (150) may receive incoming IPv4 packets from an associated receive ring on the IPv4 NIC (170), and may forward the IPv4 packets to the associated non-global container (130). Furthermore, in one or more embodiments, any outgoing IPv4 packet is forwarded from an IPv4 VNIC (150)) to a corresponding transmit ring (not shown) of the IPv4 NIC (170), which temporarily stores the IPv4 packet before transmitting the packet over the intermediate IPv4 network (102). In one or more embodiments, receive rings and transmit rings may be implemented as ring buffers in software and/or hardware.

In this description, embodiments of the invention are described in terms of global and non-global containers for the sake of illustration. However, a person of skill in the art will appreciate that these are exemplary embodiments, and are not intended to limit the invention. Specifically, embodiments of the invention may be implemented using any other virtualization technology. For example, one or more embodiments may be implemented with virtual machines instead of containers. Accordingly, a person of skill in the art will appreciate that any reference herein to containers may represent any type of virtualization technology (e.g., virtual machines, zones, partitions, and the like).

Figure 2C:
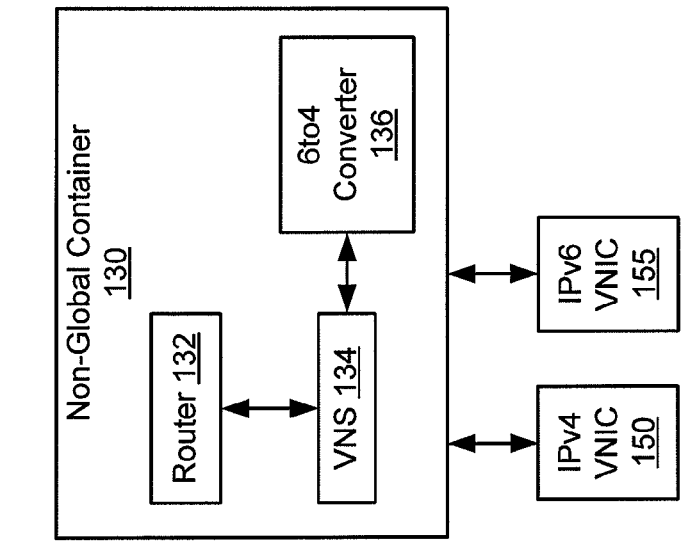
FIGS. 2A-2E show schematic diagrams in accordance with one or more embodiments of the invention.
Figure 2B:
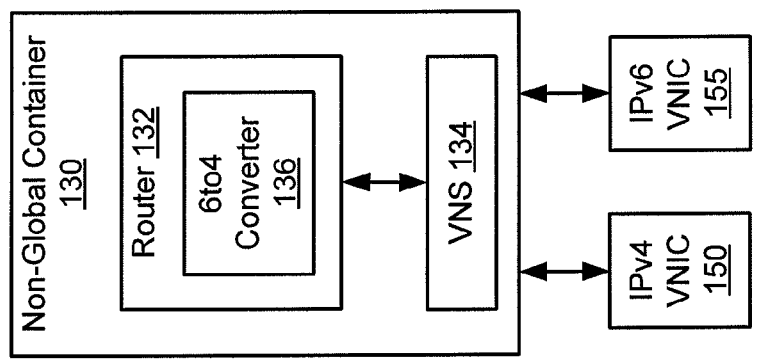
Figure 2A:
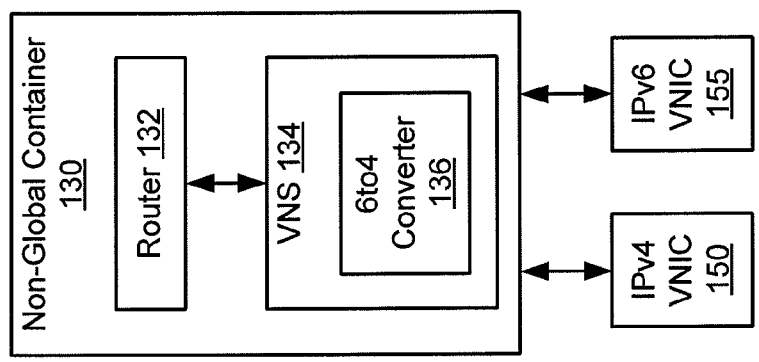

FIGS. 2A-2E show schematic diagrams of non-global containers (130) in accordance with embodiments of the invention. As shown in FIG. 2A, in one or more embodiments, a non-global container (130) may include a router (132) operatively connected to a virtual network stack (VNS) (134).

In one or more embodiments, the router (132) may be configured to route a packet to its destination based on the address information included in the packet. For example, the router (132) may route inbound IPv6 packets to destinations in the local IPv6 network (100). In one or more embodiments, the router (132) may use a routing table (not shown), which stores the best routes to certain network destinations, routing metrics associated with the routes, and the path to the next hop in the route. Optionally, the router (132) may use a routing policy.

In one or more embodiments, the VNS (134) may include functionality to process packets in accordance with various protocols used to send and receive packets (e.g., Transmission Control Protocol (TCP), Internet Protocol (IP), User Datagram Protocol (UDP), etc.). Further, the VNS (134) may also include functionality, as needed, to perform additional processing on the incoming and outgoing packets. This additional processing may include, but is not limited to, cryptographic processing, firewall routing, etc.

In one or more embodiments, the VNS (134) corresponds to a network stack with network layer and transport layer functionality. The network layer functionality may correspond to functionality to manage packet addressing and delivery on a network (e.g., functionality to support IP, Address Resolution Protocol (ARP), Internet Control Message Protocol, etc.). The transport layer functionality may correspond to functionality to manage the transfer of packets on the network (e.g., functionality to support TCP, UDP, Stream Control Transmission Protocol (SCTP), etc.).

In one or more embodiments, the VNS (134) may include inbound and outbound virtual serialization queues (not shown). The inbound virtual serialization queue may be a queue data structure configured to receive data packets from the network layer prior to the data packets being processed by the transport layer. The outbound virtual serialization queue may be a queue data structure configured to receive data packets from one or more VNICs (e.g., IPv4 VNIC (150), IPv6 VNIC (155)) with which the VNS (134) is associated.

As shown in FIG. 2A, in one or more embodiments, the VNS (134) may include a 6 to 4 converter (136). In one or more embodiments, the 6 to 4 converter (136) may be a software module configured to encapsulate an IPv6 packet in a converted packet (i.e., one or more IPv4 packets). For example, in one or more embodiments, the 6 to 4 converter (136) may embed an IPv6 packet into the payload portion of a single IPv4 packet. In another example, in one or more embodiments, the 6 to 4 converter (136) may divide an IPv6 packet into segments, and embed the individual segments in the payload portions of multiple IPv4 packets. Such division of an IPv6 packet into multiple IPv4 packets may be performed, for example, if the length of the IPv6 packet (or its payload) exceeds the payload capacity of a single IPv4 packet. The converted packet may be routed across an IPv4 network (e.g., intermediate IPv4 network (102) shown in FIG. 1A) to the IPv4 destination address specified in the header of the IPv4 packet. Optionally, in one or more embodiments, the 6 to 4 converter (136) may be implemented as one or more hardware offload devices operatively connected to the router host (110).

By way of example, assume that the non-global container receives an IPv6 packet via the IPv6 VNIC (155) from a local IPv6 network (e.g., local IPv6 network (100) shown in FIG. 1A). Assume further that the received IPv6 packet has a destination address located in a remote IPv6 network (e.g., IPv6 destination (113A) located in remote IPv6 network (103A), as shown in FIG. 1A). The 6 to 4 converter (136) may embed the IPv6 packet into the payload portion of one or more IPv4 packets to obtain a converted packet. In one or more embodiments, the router (132) may then send the converted packet to the IPv4 network via the IPv4 VNIC (150).

In one or more embodiments, the 6 to 4 converter (136) may also be configured to extract an IPv6 packet embedded in a converted packet. For example, in the case that the IPv6 packet is embedded in a single IPv4 packet, the 6 to 4 converter (136) may extract the IPv6 packet from the payload of the single IPv4 packet. In another example, in the case that the IPv6 packet is embedded in multiple IPv4 packets, the 6 to 4 converter (136) may extract the segments of the IPv6 packet from the payloads of the multiple IPv4 packets. Further, in one or more embodiments, the 6 to 4 converter (136) may reconstruct the IPv6 packet by combining the segments extracted from the payloads of the multiple IPv4 packets. Additionally, in one or more embodiments, each IPv4 packet may include information (e.g., a sequence number) to enable the reconstruction of the IPv6 packet from the payloads of the IPv4 packets. In one or more embodiments, the router (132) may then route the extracted IPv6 packet to an IPv6 destination via the IPv6 VNIC (155).

In one or more embodiments, the 6 to 4 converter (136) may be configured to convert packets sent to, and received from, a given remote IPv6 network (e.g., remote IPv6 networks (103A-103C) as shown in FIG. 1A). Specifically, the 6 to 4 converter (136) located in a given non-global container (e.g., one of the non-global containers (130A-130N) shown in FIG. 1B) is configured to convert IPv6 packets sent to, or received from, the remote IPv6 network associated with the given non-global container.

Figure 2E:
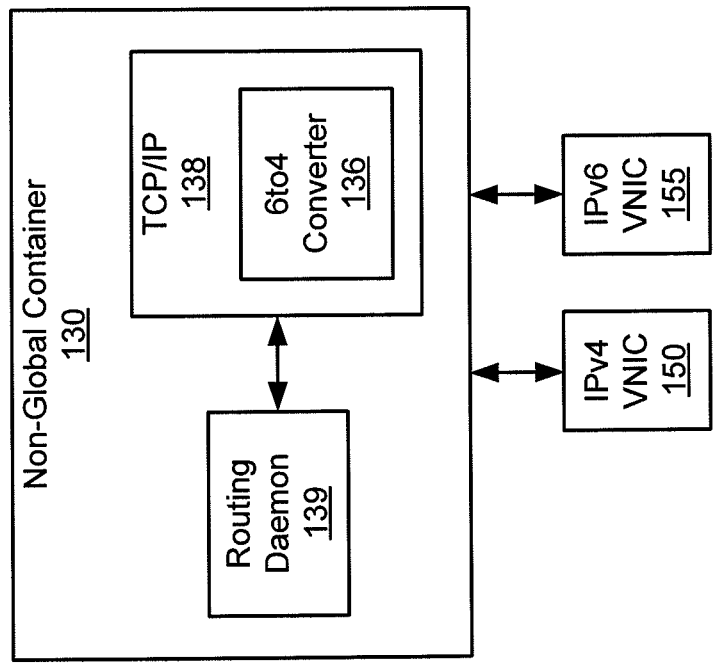
Figure 2D:
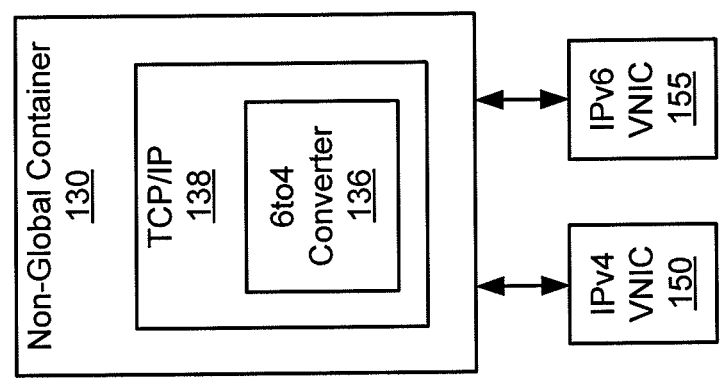

A person of skill in the art will note that the software environment shown in FIG. 2A is an exemplary embodiment, and is not intended to limit the invention. Specifically, it is contemplated that any of the functionality described above with reference to the aforementioned components (e.g., router (132), VNS (134), 6 to 4 converter (136), and the like) may be implemented in any other software components or in additional software components. For example, as shown in FIG. 2B, in one or more embodiments, the 6 to 4 converter (136) may be included in the router (132). In another example, as shown in FIG. 2C, in one or more embodiments, the 6 to 4 converter (136) may be included in the non-global container (130), and may be operatively connected to the VNS (134). In yet another example, as shown in FIG. 2D, in one or more embodiments, the 6 to 4 converter (136) may be included in a Transmission Control Protocol/Internet Protocol (TCP/IP) stack (138) located in the non-global container (130). In still another example, as shown in FIG. 2E, in one or more embodiments, a routing daemon (139) may be operatively connected to the 6 to 4 converter (136) included in the TCP/IP stack (138). The routing daemon (139) may be a background process configured to provide the same functionality as the router (132) described above.

Figure 3:
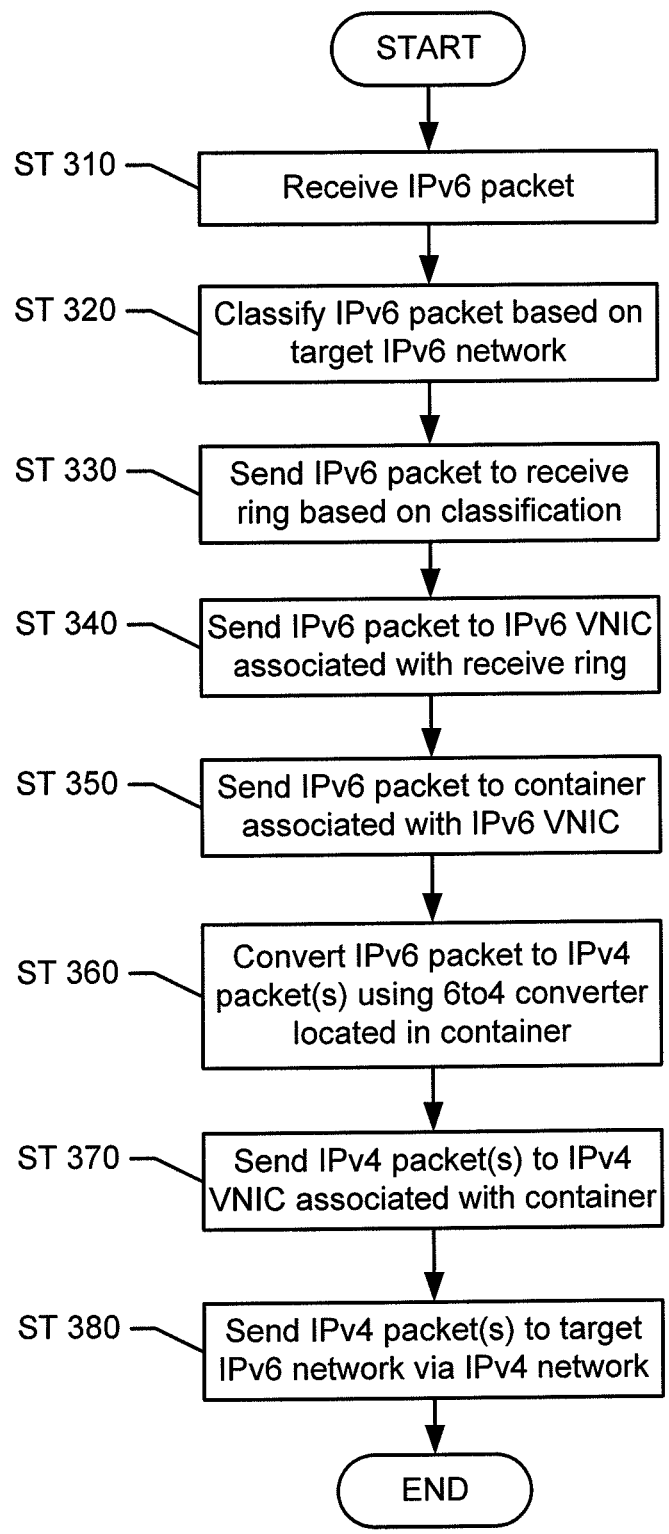
FIG. 3 shows a flowchart in accordance with one or more embodiments of the invention.
Figure 4:
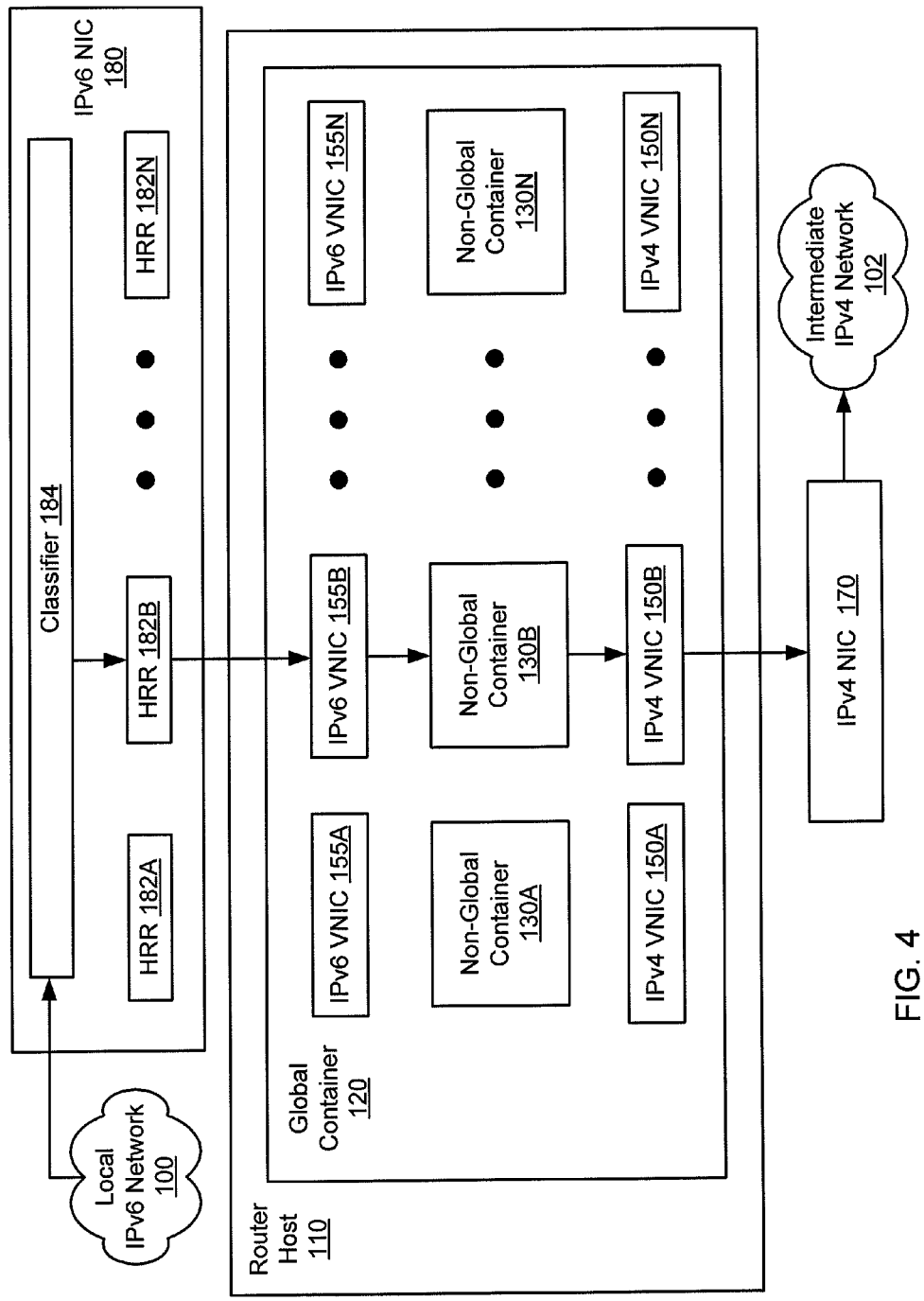
FIG. 4 shows an example in accordance with one or more embodiments of the invention.

FIG. 3 shows a flowchart of a method for sending a packet, in accordance with one or more embodiments of the invention. In one or more embodiments, the process shown in FIG. 3 may correspond to the software environments described above with reference to FIGS. 1A-1B and 2A-2E. Further, for the sake of illustration, the process shown in FIG. 3 is described below with reference to an example shown in FIG. 4. Specifically, FIG. 4 shows an example based on the system shown in FIG. 1B. Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention.

At ST 310, an IPv6 packet may be received. For example, referring to FIG. 4, the IPv6 NIC (180) may receive an IPv6 packet from a host (not shown) located in the local IPv6 network (100). Assume that the IPv6 packet is sent to a destination located in a remote IPv6 network (not shown).

At ST 320, the IPv6 packet may be classified based on a target IPv6 network. For example, referring to FIG. 4, a classifier (184) may classify the IPv6 packet based on a remote IPv6 network to which the IPv6 packet is being sent (e.g., remote IPv6 network (103A) shown in FIG. 1A).

At ST 330, the IPv6 packet may be sent to a receive ring based on the classification (performed at ST 330). For example, referring to FIG. 4, the classifier (184) may send the IPv6 packet to hardware receive ring (HRR) (182B) based on the classification.

At ST 340, the IPv6 packet may be sent to an IPv6 VNIC associated with the receive ring. For example, referring to FIG. 4, the IPv6 packet may be sent from the HRR (182B) to the IPv6 VNIC (155B) associated with the HRR (182B).

At ST 350, the IPv6 packet may be sent to a container associated with the IPv6 VNIC. For example, referring to FIG. 4, the IPv6 packet may be sent from the IPv6 VNIC (155B) to the non-global container (130B) associated with the IPv6 VNIC (155B).

At ST 360, the IPv6 packet may be converted into IPv4 packet(s) using a 6 to 4 router located in the container. For example, referring to FIG. 2A, the 6 to 4 converter (136) located in the non-global container (130) may embed the IPv6 packet into the payload portion of one or more IPv4 packets.

At ST 370, the IPv4 packet(s) may be sent to an IPv4 VNIC associated with the container. For example, referring to FIG. 4, the IPv4 packet(s) may be sent from the non-global container (130B) to the IPv4 VNIC (150B) associated with the non-global container (130B).

At ST 380, the IPv4 packet(s) may be sent to the target IPv6 network via the intermediate IPv4 network. For example, referring to FIG. 4, the IPv4 packet(s) may be sent from the IPv4 VNIC (150B) to the IPv4 NIC (170). Further, the IPv4 packet(s) may be sent from the IPv4 NIC (170) to the target IPv6 network (not shown) via the intermediate IPv4 network (102). In one or more embodiments, after passing through the intermediate IPv4 network (102), the IPv4 packet(s) may be received by a router host (not shown) located at the target IPv6 network. The processing of the IPv4 packet(s) after being received by the router host at the target IPv6 network is described below with reference to FIGS. 5 and 6. After ST 380, the process ends.

Figure 5:
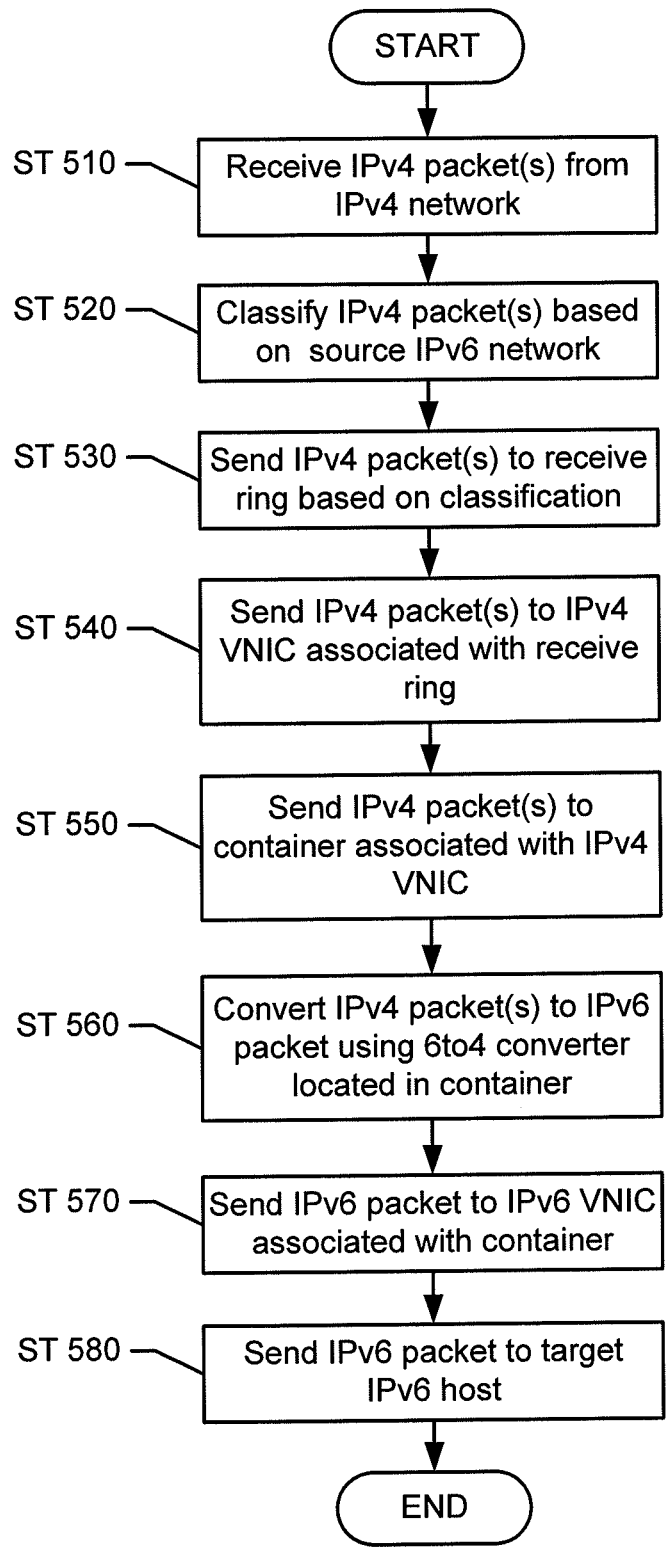
FIG. 5 shows a flowchart in accordance with one or more embodiments of the invention.
Figure 6:
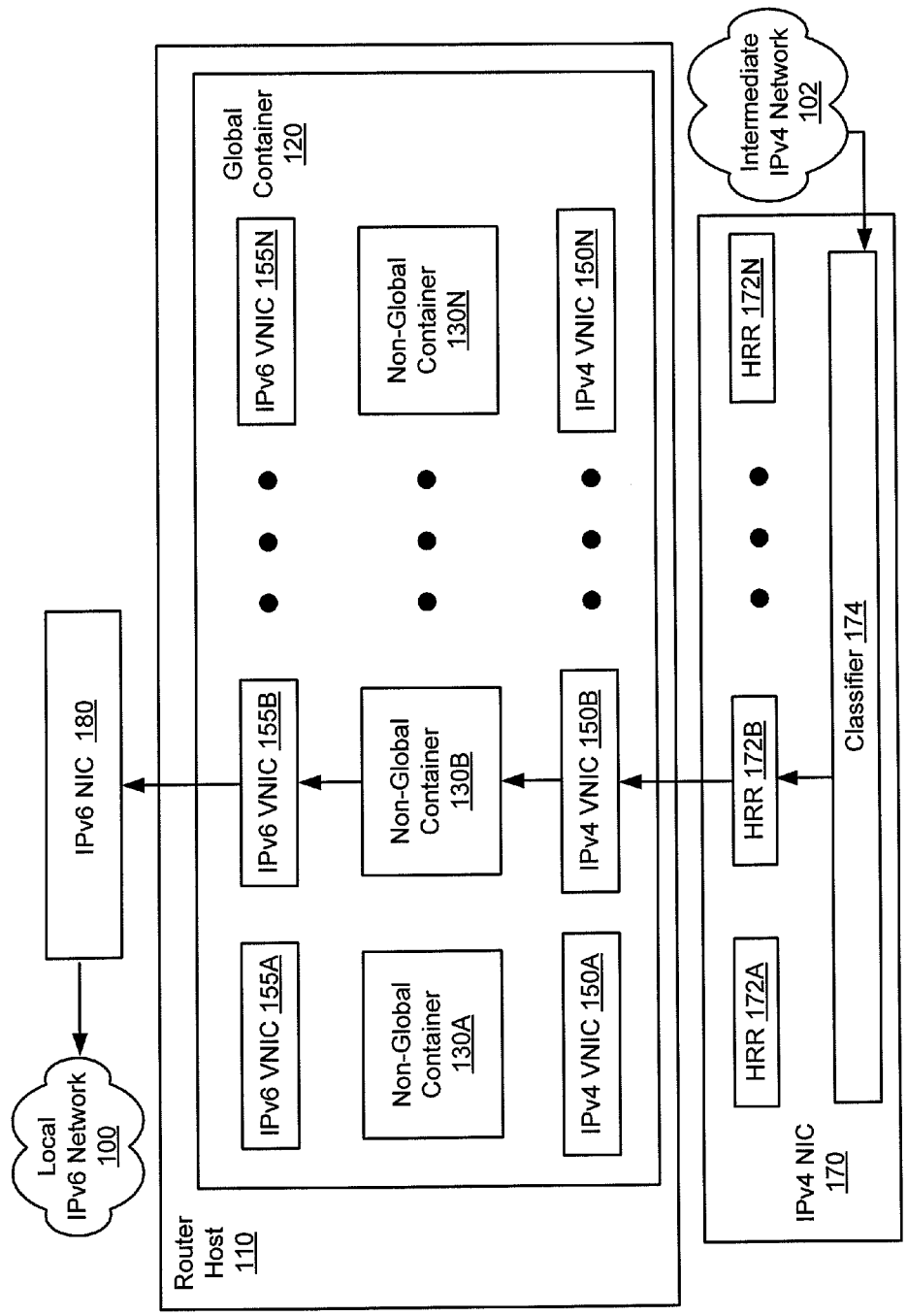
FIG. 6 shows an example in accordance with one or more embodiments of the invention.

FIG. 5 shows a flowchart of a method for receiving a packet, in accordance with one or more embodiments of the invention. In one or more embodiments, the process shown in FIG. 5 may correspond to the software environments described above with reference to FIGS. 1A-1B and 2A-2E. Further, for the sake of illustration, the process shown in FIG. 5 is described below with reference to an example shown in FIG. 6. Specifically, FIG. 6 shows an example based on the system shown in FIG. 1B. Those skilled in the art, having the benefit of this detailed description, will appreciate that the sequence of steps shown in FIG. 5 may differ among embodiments of the invention, and that one or more of the steps shown in FIG. 5 may be omitted, repeated, performed in parallel, and/or performed in a different order. Accordingly, the specific arrangement of steps shown in FIG. 5 should not be construed as limiting the scope of the invention.

At ST 510, IPv4 packet(s) may be received from an IPv4 network. For example, referring to FIG. 6, the IPv4 NIC (170) may receive IPv4 packet(s) from the intermediate IPv4 network (102). In one or more embodiments, the IPv4 packet(s) may have been sent from a source IPv6 network using the process described above with reference to FIG. 3. For example, referring to FIG. 1A, assume that the IPv4 packet(s) are generated by a router host (not shown) located in the remote IPv6 network (103B), is communicated through the intermediate IPv4 network (102), and is then received by the router host (110) located in the local IPv6 network (100).

At ST 520, the IPv4 packet(s) may be classified based on the source IPv6 network. For example, referring to FIG. 6, a classifier (174) may classify the IPv4 packet(s) based on the source IPv6 network from which the IPv6 packet is sent (e.g., remote IPv6 network (103B) shown in FIG. 1A).

At ST 530, the IPv4 packet(s) may be sent to a receive ring based on the classification (performed at ST 520). For example, referring to FIG. 6, the classifier (174) may send the IPv4 packet(s) to HRR (172B) based on the classification.

At ST 540, the IPv4 packet(s) may be sent to an IPv4 VNIC associated with the receive ring. For example, referring to FIG. 6, the IPv4 packet(s) may be sent from the HRR (172B) to the IPv4 VNIC (150B) associated with the HRR (172B).

At ST 550, the IPv4 packet(s) may be sent to a container associated with the IPv4 VNIC. For example, referring to FIG. 6, the IPv4 packet(s) may be sent from the IPv4 VNIC (150B) to the non-global container (130B) associated with the IPv4 VNIC (150B).

At ST 560, the IPv4 packet(s) may be converted into an IPv6 packet using a 6 to 4 router located in the container. For example, referring to FIG. 2A, the 6 to 4 converter (136) located in the non-global container (130) may extract the IPv6 packet from the payload portion(s) of IPv4 packet(s), and reconstruct the IPv6 packet.

At ST 570, the IPv6 packet may be sent to an IPv6 VNIC associated with the container. For example, referring to FIG. 6, the IPv6 packet may be sent from the non-global container (130B) to the IPv6 VNIC (155B) associated with the non-global container (130B).

At ST 580, the IPv6 packet may be sent to a target IPv6 host located in a local IPv6 network. For example, referring to FIG. 6, the IPv6 packet may be sent from the IPv6 VNIC (155B) to the IPv6 NIC (180). Further, the IPv6 packet may be sent from the IPv6 NIC (180) to one of the IPv6 hosts (112A-112B) located in the local IPv6 network (100). After ST 580, the process ends.

A person of skill in the art will appreciate that, in the above description, any reference to the IPv6 and IPv4 protocols is provided for the sake of illustration, and is not intended to limit embodiments of the invention. As such, any references to the IPv6 and IPv4 protocols may represent any combination of network protocols. Further, any reference to the functionality of a 6 to 4 converter (136) may represent any functionality known in the art for converting packets from a first protocol to a second protocol.

Furthermore, a person of skill in the art will note that the software environments shown in FIGS. 1A-1B, 2A-2E, 4, and 6 are exemplary embodiments, and are not intended to limit the invention. For example, for sake of clarity, FIG. 1B shows the local IPv6 network (100) is shown as including two IPv6 hosts (112), and each remote IPv6 network (103) is shown as including one IPv6 destination (113). However, it is contemplated that each of the IPv6 networks (100, 103) may include any number of IPv6 hosts (112) and/or destinations (113). In another example, in one or more embodiments, it is contemplated that any of the functionality described above with reference to the 6 to 4 converter (136) may be implemented in any other software component. In yet another example, in one or more embodiments, the router host (110) may also be an IPv6 host (112) and/or IPv6 destination (113).

Figure 7:
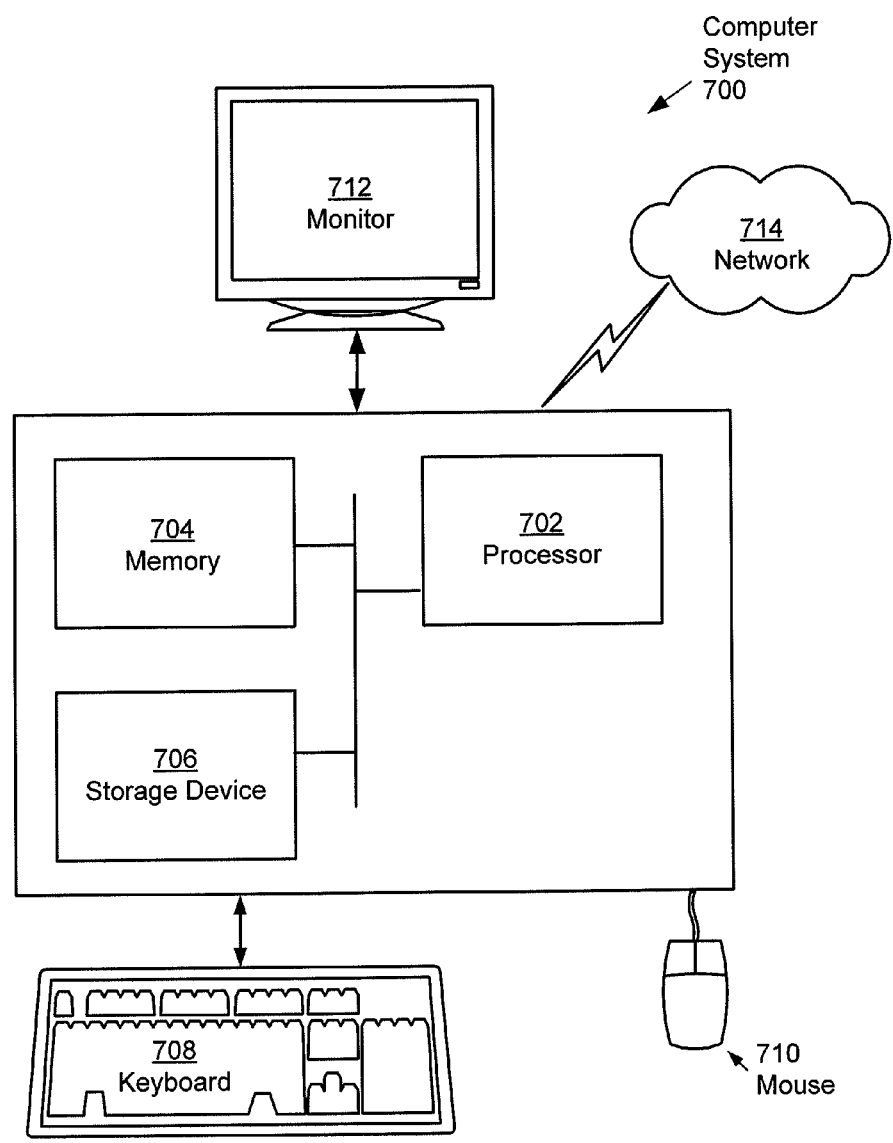
FIG. 7 shows a computer system in accordance with one or more embodiments of the invention.

The invention may be implemented on virtually any type of computer regardless of the platform being used. For example, as shown in FIG. 7, a computer system (700) includes a processor (702), such as a hardware processor, an integrated circuit, a central processing unit (CPU), etc., associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a network (714) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., virtual NIC, virtual network stack, container, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention may multiple networks based on a first protocol to communicate across an intermediate network based on a second protocol. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising computer readable program code embodied therein, the computer readable program code adapted to, when executed by a processor, perform a method for processing packets, the method comprising:
receiving a first packet from an intermediate network by a first network interface card (NIC) operatively connected to a host, wherein the first packet originates from a first remote network, wherein the first NIC is operatively connected to the intermediate network, wherein the first packet, the intermediate network, and the first NIC use a first network protocol;
classifying, by the first NIC, the first packet based on the first remote network;
sending the first packet to a first receive ring in the first NIC based on the classification of the first packet;
sending the first packet from the first receive ring to a first non-global container, wherein the first non-global container is located in a global container; and
converting the first packet, using a first converter located in the first non-global container, to obtain a first converted packet;
receiving a second packet from the intermediate network by the first NIC operatively connected to the host, wherein the second packet originates from a second remote network, and wherein the second packet uses the first network protocol;
classifying, by the first NIC, the second packet based on the second remote network;
sending the second packet to a second receive ring in the first NIC based on the classification of the second packet;
sending the second packet from the second receive ring to a second non-global container, wherein the second non-global container is located in the global container; and
converting the second packet, using a second converter located in the second non-global container, to obtain a second converted packet,
wherein the first converted packet, the second converted packet, the first remote network, and the second remote network use a second network protocol.

2. The computer readable medium of claim 1, wherein sending the first packet from the first receive ring to the first non-global container comprises:
sending the first packet from the first receive ring to a virtual network interface card (VNIC) associated with the first receive ring, wherein the VNIC is one of a plurality of VNICs located in the global container;
sending the first packet from the VNIC to the first non-global container, wherein the first non-global container is associated with the VNIC,
wherein the plurality of VNICs uses the first network protocol.

3. The computer readable medium of claim 1, further comprising:
sending the first converted packet from the first non-global container to a virtual network interface card (VNIC) associated with the first non-global container, wherein the VNIC is one of a plurality of VNICs located in the global container, and
wherein the plurality of VNICs uses the second network protocol.

4. The computer readable medium of claim 3, further comprising:
sending the first converted packet from the VNIC to a second NIC; and
sending the first converted packet from the second NIC to a destination located in a local network,
wherein the second NIC is operatively connected to the local network, and
wherein the second NIC and the local network use the second network protocol.

5. The computer readable medium of claim 1, further comprising:
receiving a third packet from a local network by a second NIC, wherein the third packet originates from the local network and is sent to a destination located in the second remote network, wherein the third packet, the second NIC, and the local network use the second network protocol;
classifying, by the second NIC, the third packet based on the second remote network;
sending the third packet to a third receive ring in the second NIC based on the classification of the third packet;
sending the second packet from the second receive ring to a VNIC associated with the third receive ring, wherein the VNIC is one of a plurality of VNICs located in the global container, wherein the plurality of VNICs use the second network protocol;
sending the third packet from the VNIC to the second non-global container associated with the VNIC; and
converting the third packet, using the second converter located in the second non-global container, to obtain a third converted packet using the first network protocol.

6. The computer readable medium of claim 5, further comprising:
sending the third converted packet from the second non-global container to the first NIC; and
sending the third converted packet from the first NIC to the destination using the intermediate network.

7. The computer readable medium of claim 1,
wherein sending the second packet from the second receive ring to the second non-global container comprises:
sending the second packet from the second receive ring to a VNIC associated with the second receive ring, wherein the VNIC is one of a plurality of VNICs located in the global container, wherein the plurality of VNICs uses the first network protocol; and
sending the second packet from the VNIC to the second non-global container associated with the VNIC, and
wherein the method further comprises:
sending the second converted packet, using a second NIC, to a destination located in a local network, wherein the local network uses the second network protocol.

8. The computer readable medium of claim 1, wherein the first receive ring is one of a plurality of receive rings in the first NIC.

9. The computer readable medium of claim 1, wherein the global container is located in the host.

10. The computer readable medium of claim 1, wherein the first network protocol is Internet Protocol version 4 (IPv4).

11. The computer readable medium of claim 10, wherein the second network protocol is Internet Protocol version 6 (IPv6).

12. A system, comprising:
a first physical network interface card (NIC) operatively connected to a local network and comprising:
  a classifier;
  a first receive ring; and
  a second receive ring,
  wherein the classifier is configured to:
    classify a first packet received from the local network according to a first destination network of the first packet,
    send the first packet to the first receive ring based on the classification of the first packet,
    classify a second packet received from the local network according to a second destination network of the second packet, and
    send the second packet to the second receive ring based on the classification of the second packet,
    wherein the local network, the first destination network, the second destination network, the second packet, and the first packet use a first network protocol;
a first router host, operatively connected to the first NIC, comprising:
  a global container, comprising:
    a first non-global container associated with the first destination network and comprising a first converter;
    a second non-global container associated with the second destination network and comprising a second converter;
    a first virtual network interface card (VNIC) configured to receive the first packet from the first receive ring;
    a second VNIC configured to receive the second packet from the second receive ring,
    wherein the first non-global container is configured to receive the first packet from the first VNIC,
    wherein the second non-global container is configured to receive the second packet from the second VNIC,
    wherein the first converter is configured to convert the first packet into a first converted packet using a second network protocol,
    wherein the second converter is configured to convert the second packet into a second converted packet using the second network protocol,
    wherein the first converted packet is addressed to a second router host located in the first destination network, and
    wherein the second converted packet is addressed to a third router host located in the second destination network.

13. The system of claim 12, further comprising:
a second physical NIC operatively connected to an intermediate network,
wherein the intermediate network uses the second network protocol,
wherein the local network and the first destination network are connected by the intermediate network.

14. The system of claim 12, wherein the first converter is included in a Virtual Network Stack (VNS) located in the first non-global container.

15. The system of claim 12, wherein the first converter is included in a router module located in the first non-global container.

16. A non-transitory computer readable medium comprising computer readable program code embodied therein, the computer readable program code adapted to, when executed by a processor, perform a method for processing packets, the method comprising:
  receiving a first packet from a local network by a first network interface card (NIC) operatively connected to a router host, wherein the first packet originates from the local network and is sent to a first destination located in a first remote network, wherein the first NIC is operatively connected to the local network;
  classifying, by the first NIC, the first packet based on the first remote network;
  sending the first packet to a first receive ring in the first NIC based on the classification of the first packet;
  sending the first packet from the first receive ring to a first virtual network interface card (VNIC) associated with the first receive ring;
  sending the first packet from the first VNIC to a first non-global container associated with the first VNIC;
  converting the first packet, using a first converter located in the first non-global container, to obtain a first converted packet;
  sending the first converted packet from the first non-global container to a second VNIC associated with the first non-global container;
  sending the first converted packet from the second VNIC to a second NIC; and
  sending the first converted packet from the second NIC to the first destination using an intermediate network,
  wherein the second NIC is operatively connected to the intermediate network,
  wherein the first packet, the local network, the first remote network, the first NIC, and the first VNIC use a first network protocol,
  wherein the first converted packet, the second VNIC, the second NIC, and the intermediate network use a second network protocol,
  wherein the first non-global container is one of a plurality of non-global containers located in a global container,
  wherein the first remote network is one of a plurality of remote networks,
  wherein each of the plurality of non-global containers is uniquely associated with one of a plurality of remote networks,
  wherein each of the plurality of non-global containers shares a common kernel and executes within a common operating system,
  wherein the first VNIC is one of a first plurality of VNICs,
  wherein the second VNIC is one of a second plurality of VNICs,
  wherein each of the plurality of non-global containers is uniquely associated with one of the first plurality of VNICs, and
  wherein each of the plurality of non-global containers is uniquely associated with one of the second plurality of VNICs.

* * * * *